US011859780B1

(12) United States Patent
Li

(10) Patent No.: US 11,859,780 B1
(45) Date of Patent: Jan. 2, 2024

(54) LIGHT SOURCE SWITCHING APPARATUS FOR FLASHLIGHT

(71) Applicant: Wenjie Li, Guangdong (CN)

(72) Inventor: Wenjie Li, Guangdong (CN)

( * ) Notice: Subject to any disclaimer, the term of this patent is extended or adjusted under 35 U.S.C. 154(b) by 0 days.

(21) Appl. No.: 18/329,735

(22) Filed: Jun. 6, 2023

(30) Foreign Application Priority Data

Mar. 31, 2023 (CN) ........................ 202320695796.1

(51) Int. Cl.

| | |
|---|---|
| ***F21L 4/00*** | (2006.01) |
| ***F21V 23/04*** | (2006.01) |
| ***F21V 7/04*** | (2006.01) |
| ***F21V 7/28*** | (2018.01) |
| *F21Y 101/00* | (2016.01) |

(52) U.S. Cl.
CPC .............. *F21L 4/005* (2013.01); *F21V 7/041* (2013.01); *F21V 7/28* (2018.02); *F21V 23/0414* (2013.01); *F21Y 2101/00* (2013.01)

(58) Field of Classification Search
CPC .... F21Y 2101/00; F21V 23/0414; F21V 7/28; F21V 4/005
See application file for complete search history.

(56) References Cited

U.S. PATENT DOCUMENTS 7,461,944 B2 * 12/2008 Alessio .................. F21L 14/00 362/322
10,119,663 B2 * 11/2018 Bayat ................. F21V 23/0428

FOREIGN PATENT DOCUMENTS

CN 106796021 A * 5/2017 ............. F21L 4/027
CN 218095518 U * 12/2022

OTHER PUBLICATIONS

Innovation Q+ NPL Search (Year: 2023).*

* cited by examiner

*Primary Examiner* — Anabel Ton

(57) ABSTRACT

Disclosed is a light source switching apparatus for a flashlight, which includes a floodlight source and a spotlight source, a lamp strip plate serves as the floodlight source, and a main lamp plate serves as the spotlight source, with a gasket with a set thickness padded in between; a lens support mounted on the floodlight source, with a lens carried thereon, the lens is trumpet-shaped, the central circular area and the outer ring area have different set cross sections, so that the floodlight source and the spotlight source in the flashlight may penetrate through different areas of the lens for realizing the integration of the spotlight and floodlight functions, and meanwhile, the operation is convenient.

9 Claims, 7 Drawing Sheets

LIGHT SOURCE SWITCHING APPARATUS FOR FLASHLIGHT

TECHNICAL FIELD

The present application relates to the technical field of lighting, in particular to a light source switching apparatus for a flashlight.

BACKGROUND

In the technical field of lighting, in order to take into account of both long-distance lighting in a small range and short-distance lighting in a large range, a lighting appliance capable of integrating two functions is required. The Chinese patent application publication No. CN101761799B discloses a Light Emitting Diode (LED) lamp, which is provided with a dual-light reflector for integrating spotlight and floodlight functions. The switching between spotlight and floodlight modes is realized by manually adjusting the distance between a light source and the light reflector, but this way makes the lighting appliance have a complicated overall structure and a large overall volume, meanwhile, the switching operation is inconvenient, which is not favorable for being disposed in portable lighting appliances such as flashlights.

SUMMARY

In view of this, there is a need to provide a light source switching apparatus for a flashlight aiming at the above problems.

In order to realize the purpose, the technical solution adopted by the present application is as follows.

A light source switching apparatus for a flashlight includes: a floodlight source, a spotlight source, and a lens mounted in front of the floodlight source.

The floodlight source is disposed on a lamp strip plate and the spotlight source is disposed on a main lamp plate.

The floodlight source and the spotlight source are disposed at a set distance in the axial direction.

The back surface of the lens includes three conical surfaces with non-collinear buses, a first reflecting surface, a transition surface and a second reflecting surface in sequence from back to front.

The boundary line of the transition surface and the second reflecting surface intersects with a ray from the central point of the end part of the small end of the lens to the boundary line of the transition surface and the first reflecting surface or is positioned at the rear side of the extension line.

The small end of the lens is sunken inwards to form a sunken space, and a first incident surface for receiving forward light and a second incident surface for receiving lateral light are disposed in the sunken space.

The large end of the lens is provided with a first emergent surface which is sunken inwards and is conical and a second emergent surface which is flat and annular, and light of the light source is emitted out through the first emergent surface and the second emergent surface.

Furthermore, the light source switching apparatus for a flashlight further includes a gasket, the gasket is disposed between the floodlight source and the spotlight source, the set distance between the floodlight source and the spotlight source in the axis direction is ensured, and the floodlight source is disposed in the front relative to the spotlight source.

Furthermore, the lens is carried on a lens support, and the lens support is provided with a mounting surface adaptive to the lens in shape.

Furthermore, the light source switching apparatus for a flashlight further includes a flashlight head and a lamp holder, and the spotlight source, the floodlight source, the lens and the lens support are coaxially coated and mounted in a space formed after the flashlight head and the lamp holder are mounted.

Furthermore, a mirror is disposed between the flashlight head and the lens.

Furthermore, the back surface, relative to the mounting surface, of the lens support, is provided with two positioning columns, the floodlight source is provided with two first positioning holes, the mounting surface of the lamp holder is provided with a concave part adaptive to the outer contour of the main lamp plate, the mounting surface of the lamp holder is further provided with two second positioning holes, and the positioning columns, the first positioning holes and the second positioning holes are in one-to-one correspondence.

The positioning columns of the lens support penetrate through the first positioning holes in the floodlight source and are further inserted into the second positioning holes in the lamp holder, so that the floodlight source, the gasket and the spotlight source are fastened on the lamp holder.

Furthermore, the flashlight head and the lamp holder are screwed and installed in a threaded mode.

Furthermore, the light source switching apparatus for a flashlight has two working states: floodlight irradiation state and spotlight irradiation state, in the floodlight irradiation state, both the spotlight source and the floodlight source emit light; in the spotlight irradiation state, only the spotlight source emits light.

Furthermore, the surface, in contact with the lens, of the lens support is provided with a reflective coating. The disclosure has the following beneficial effects.

By adoption of the lens with the structure of the present application, two light sources are matched for use, switching between the spotlight irradiation function and the floodlight irradiation function is realized in a portable small appliance such as a flashlight, and meanwhile, the switching is completed without involving the action of mechanical parts, so that a flashlight with the structure is not easy to damage and may be lightweight on the whole.

DESCRIPTION OF REFERENCE NUMERALS

Figure 1:
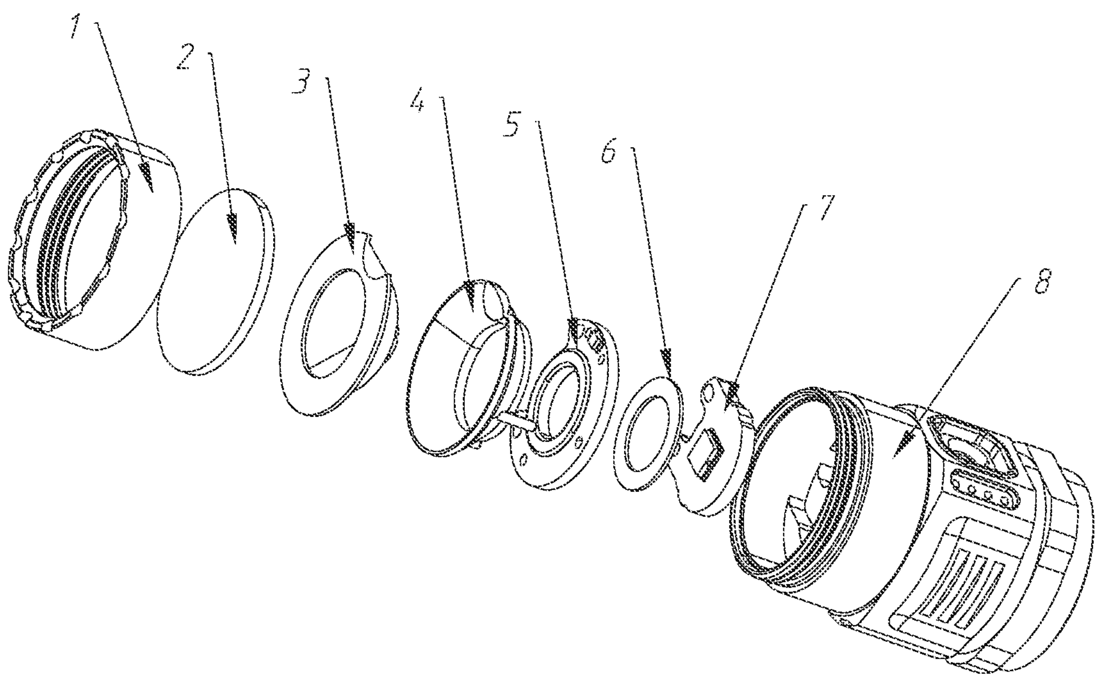
FIG. 1 is a schematic diagram of an exploded view of the present application.

1. Flashlight head; 2. Mirror; 3. Lens; 4. Lens support; 41. Positioning column; 5. Lamp strip plate; 51. First positioning hole; 6. Heat dissipation gasket; 7. Main lamp plate; 8. Lamp holder; 81. Second positioning hole; 9. Floodlight source; 10. Spotlight source; 11. Concave part; 12. Reflective coating; 13. Sunken space; 31. First incident surface; 32. Second incident surface; 33. First emergent surface; 34. Second emergent surface; 35. First reflecting surface; 36. Transition surface; and 37. Second reflecting surface.

DETAILED DESCRIPTION OF THE EMBODIMENTS

In order to describe the technical solutions in the embodiments of the present application or the relevant art more clearly, the present application will be further introduced below in combination with specific embodiments and drawings, obviously, the drawings described below are only some embodiments of the present application, and other drawings can further be obtained by those of ordinary skill in the art according to the drawings without creative work.

It is to be understood that orientation or position relationships indicated by terms "upper", "lower", "front", "rear", "left", "right", "horizontal", "top", "inner" and the like are orientation or position relationships shown in the drawings, are adopted not to indicate or imply that indicated apparatuses or components must be in specific orientations or structured and operated in specific orientations but only to conveniently and simply describe the present application and thus should not be understood as limits to the present application.

Terms "first", "second" and "third" are only adopted for description and should not be understood to indicate or imply relative importance or implicitly indicate the number of indicated technical features. Therefore, a feature defined by "first", "second" and "third" may explicitly or implicitly indicate inclusion of at least one such feature. In the description of the present application, "a group" means two or more, unless otherwise specified.

As shown in FIG. 1, a light source switching apparatus for a flashlight includes: a lamp strip plate 5, a main lamp plate 7, a heat dissipation gasket 6, a lens support 4, a lens 3, a flashlight head 1, a lamp holder 8 and a mirror 2.

The lamp strip plate 5 is provided with a floodlight source 9 and the main lamp plate 7 is provided with a spotlight source 10, as shown in FIG. 1, the floodlight source 9 is annular, the spotlight source 10 is square-block-shaped, and the floodlight source 9 and the spotlight source 10 are located on the same axis.

The heat dissipation gasket 6 is disposed between the lamp strip plate 5 and the main lamp plate 7, by means of the thickness of the heat dissipation gasket, the heat dissipation gasket 6 may separate the lamp strip plate 5 and the main lamp plate 7, so that the installed lamp strip plate 5 and main lamp plate 7 have the same distance with the thickness value of the heat dissipation gasket in the axial direction, thus eliminating a dark area that may appear when the spotlight source and the floodlight source illuminate at the same time, and the preferred thickness of the cheat dissipation gasket is 0.5 mm.

The lens support 4 is mounted on the lamp strip plate 5, the lens 3 is carried on the lens support 4, the lens 3 is trumpet-shaped, and the central circular part and the outer ring part have different setting cross sections, which are configured to pass through light of the spotlight source and the floodlight source. The lens support is hollow-trumpet-shaped and has a set size, when the two are installed, a protruding surface of the lens 3 may fit with a concave surface of the lens support.

The lens 3, the lens support 4, the lamp strip plate 5 and the main lamp plate 7 are coaxially coated and mounted between the flashlight head 1 and the lamp holder 8.

The mirror 2 is disposed between the flashlight head 1 and the lens 3.

Figure 2:
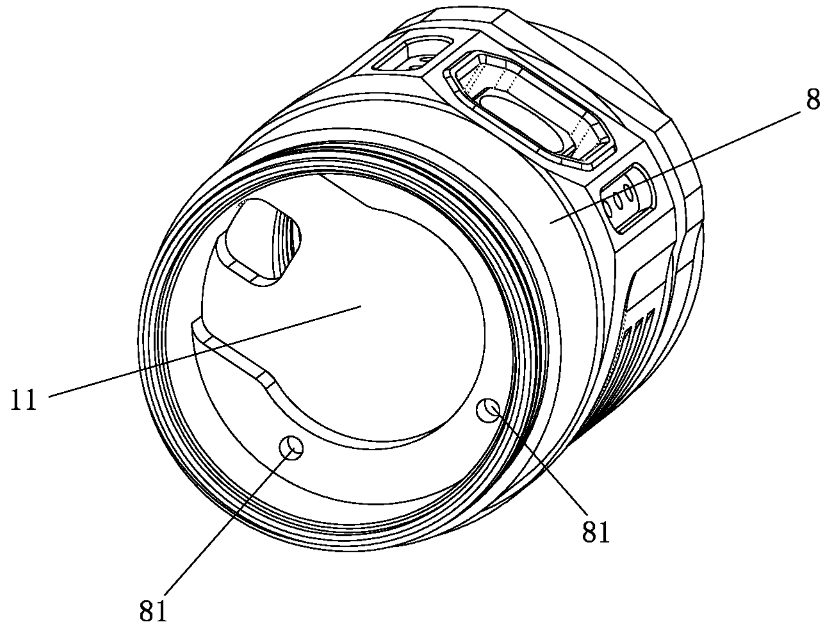
FIG. 2 is a schematic diagram of a lamp holder of the present application.

As shown in FIG. 2, in the embodiment, the lamp holder 8 is provided with a concave part with a set shape, and the shape of the concave part matches the shape of the main lamp plate 7, so that the main lamp plate 7 may be mounted on the lamp holder 8 in an embedded mode. In addition, two positioning holes 81 are further formed in the concave edge of the lamp holder 8.

Figure 3:
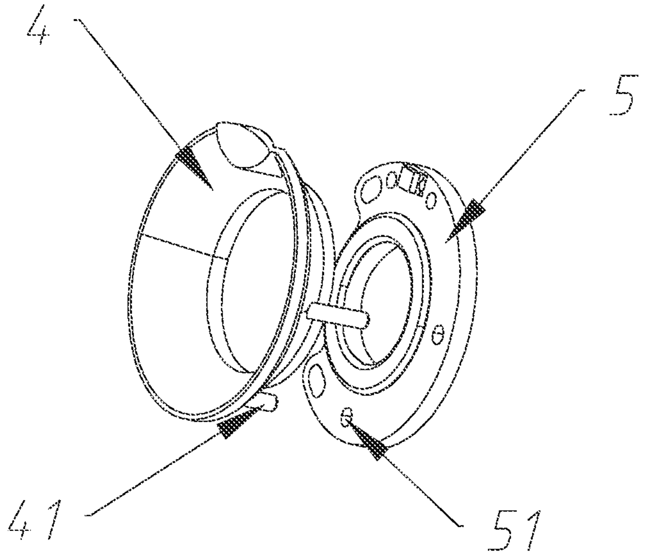
FIG. 3 is a schematic diagram of cooperation between a lens support and a lamp strip plate of the present application.

As shown in FIG. 3, in the embodiment, the lens support 4 is further provided with two positioning columns 41, and the lamp strip plate 5 is provided with two first positioning holes 51. The positioning columns 41, the first positioning holes 51 and the second positioning holes 81 are in one-to-one correspondence, during mounting, the positioning columns on the lens support 4 penetrate through the first positioning holes 51 in the lamp strip plate 5 and are further inserted into the corresponding second positioning holes 81 in the lamp holder 8, so that the lamp strip plate 5 and the heat dissipation gasket 6 are fastened on the lamp holder 8, the rotation of the lens support 4 and the main lamp plate 7 around the axis is avoided, and therefore, the relative position of the lamp strip plate 5 and the main lamp plate 7 may be fixed by virtue of the above structure.

In the embodiment, the connection between the flashlight head 1 and the lamp holder 8 is tightened by means of threads, and in other embodiments of the present application, the connection may also be made by means of a snap, etc.

In the embodiment, when the flashlight works at the spotlight irradiation state, only the spotlight source on the main lamp plate 7 works; and when the flashlight works at the floodlight irradiation state, both the spotlight source on the main lamp plate 7 and the floodlight source on the lamp strip plate 5 are in the working state.

Figure 4:
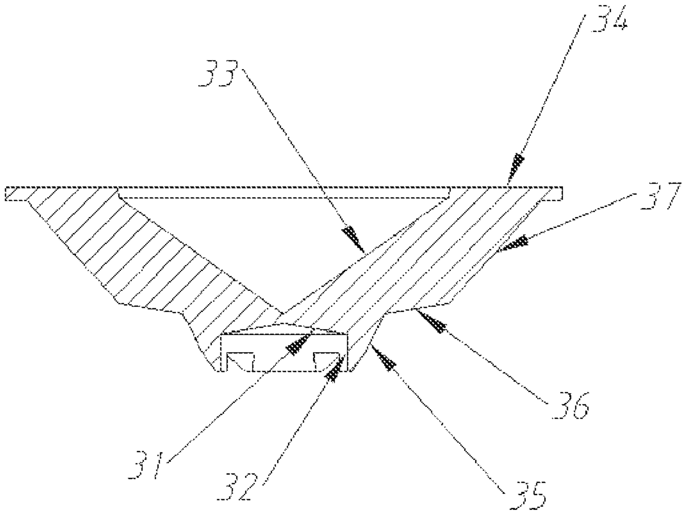
FIG. 4 is a schematic diagram of a cross-sectional view of a lens.
Figure 5:
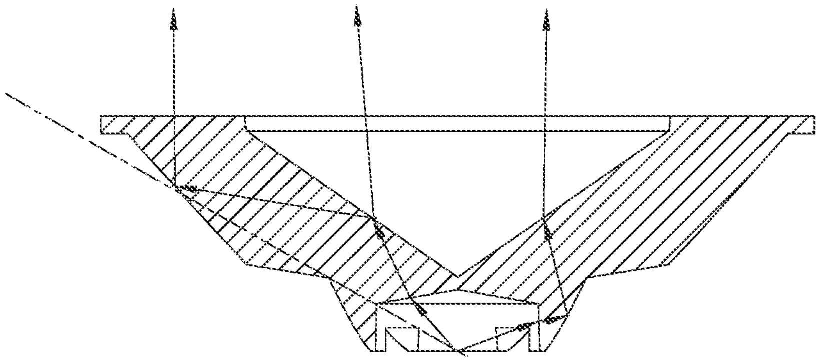
FIG. 5 is a schematic diagram of a light path, reflected by a lens, of the spotlight source.
Figure 7:
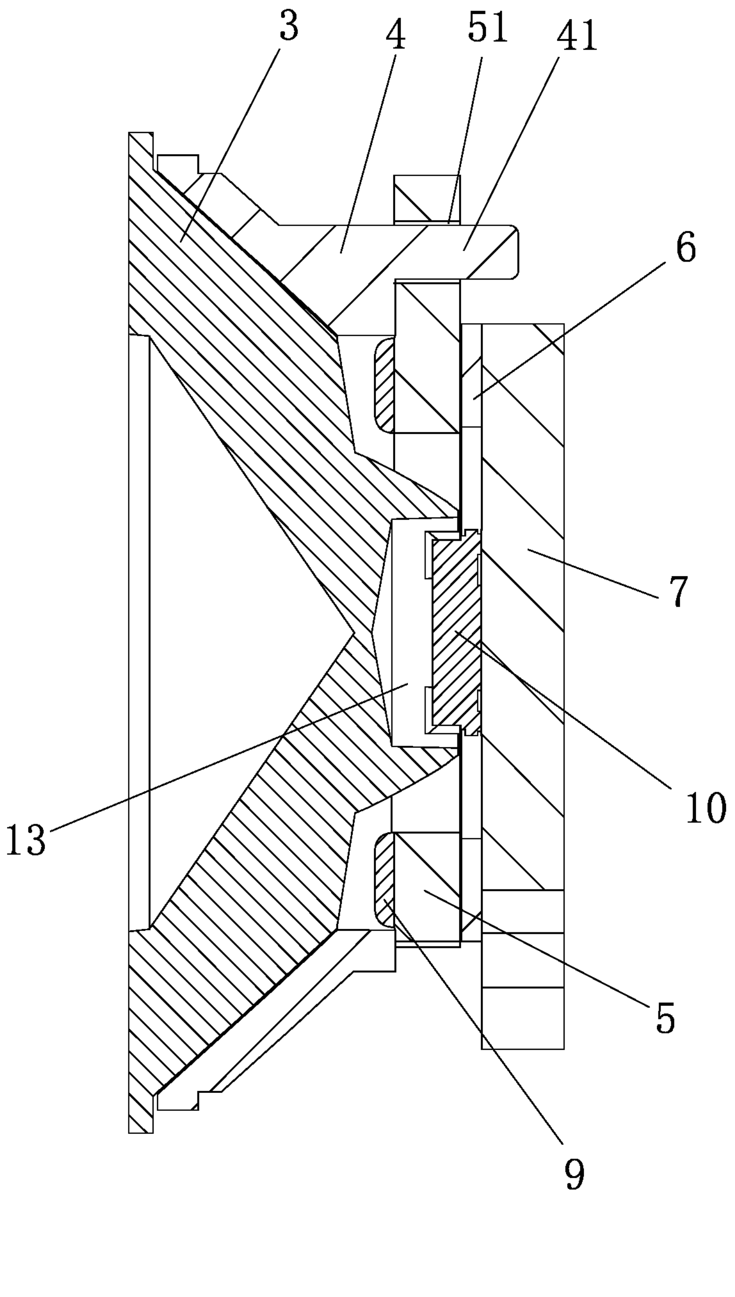
FIG. 7 is a schematic diagram of a cross-sectional view of a connection relationship of a lens, a lens support, a lamp strip plate, and a main lamp plate.

Specifically, FIG. 4, FIG. 5 and FIG. 7 illustrate the cross-section structure of lens 3, the lens 3 is trumpet-shaped with the end close to the light source sinking inwards, the sunken space may contain the spotlight source inside, the sunken space has a first incident surface 31 and a second incident surface 32, the surface, through which light is emitted, of the lens 3 includes a conical inner front surface, known as the first emergent surface 33, and an annular front surface, known as the second emergent surface 34. The back surface of the lens includes three conical surfaces with non-collinear buses, a first reflecting surface 35, a transition surface 35 and a second reflecting surface 37 in sequence from back to front.

As shown in FIG. 4, taking the bottom of the sunken space of the end, close to the light source, of lens 3 as a starting point, junction points of the first incident surface 31 and the second incident surface 32 on the section of FIG. 5 are connected and an extension line is made, the extension line will pass through the junction of transition surface 36 and second reflecting surface 37 (in other embodiments, the junction of the transition surface 36 and second reflecting surface 37 is located at the rear side of the extension line, which has the same technical effect). Therefore, in the lens 3 with the structure, most of forward light may emit into the lens body through the first incident surface 31 and be refracted, and then emerge from the first emergent surface 33 and refracted again, and light is emitted towards the front of the lens 3; a small amount of light emitted to the first emergent surface 33 will be reflected to the second reflecting surface 37 and reflected again, emitted from the first emergent surface 33, refracted again, and emitted forwards; most of the lateral light may enter the lens body through the second incident surface 32 and be refracted, then light is emitted to the first reflecting surface 34, in such a case, because the refractive index inside the lens is higher than that of the outside, and light emitted to the first reflecting surface 34 meets the requirement that the incidence angle is greater than the critical angle, light will have total internal reflection, light is emitted to the emergent surface 33 after being reflected by the main reflecting surface 34, after refraction, light is emitted towards the front of lens 3, the lens enables light emitted by the light source be refracted and reflected for a plurality of times inside the lens so as to be converted into collimating light emitted from the emergent surface of the lens as far as possible, meanwhile, light condensing is enhanced under assistance of the support, which has a very high utilization efficiency of light, meanwhile, the collimation of the emergent light is high, and spotlight and long-range shooting effects may be realized.

Figure 6:
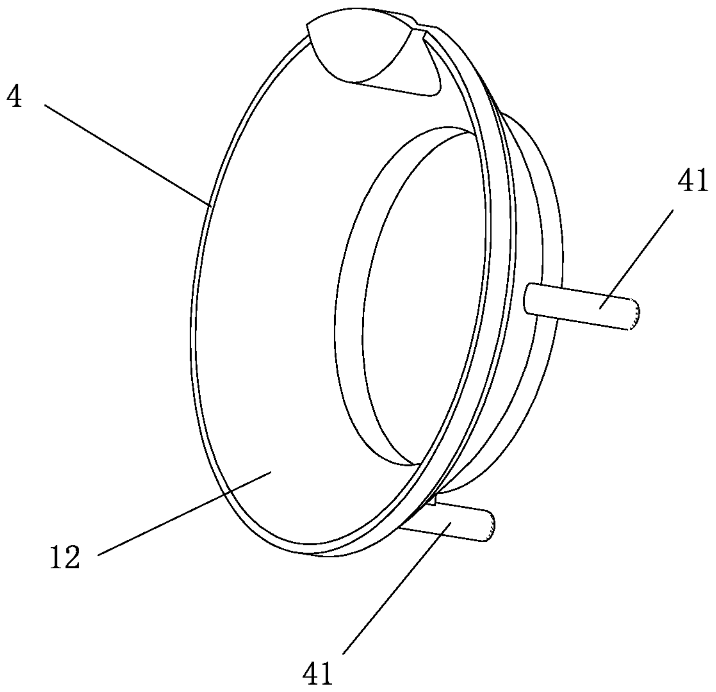
FIG. 6 is a schematic diagram of a lens support.

As shown in FIG. 6, the surface, in contact with the lens 3, of the lens support 4 is further coated with a reflective coating 12 for enhancing reflection of light on the second reflecting surface 37, further reducing loss of light.

The embodiments described above represent only several implementation modes of the present application, and the description thereof is specific and detailed, but should not be construed as limiting the scope of present application accordingly. It should be pointed out that those of ordinary skill in the art can also make some modifications and improvements without departing from the concept of the present application, and these modifications and improvements all fall within the scope of protection of the present application. Accordingly, the scope of protection of the patent of the present application should be subject to the appended claims.

What is claimed is:

1. A light source switching apparatus for a flashlight, comprising:

a floodlight source and a spotlight source;

the floodlight source is disposed on a lamp strip plate and the spotlight source is disposed on a main lamp plate;

the floodlight source and the spotlight source are disposed at a set distance in the axial direction;

a lens mounted in front of the floodlight source;

the back surface of the lens comprises three conical surfaces with non-collinear buses, a first reflecting surface, a transition surface and a second reflecting surface in sequence from back to front;

the boundary line of the transition surface and the second reflecting surface intersects with a ray from the central point of the end part of the small end of the lens to the boundary line of the transition surface and the first reflecting surface or is positioned at the rear side of the extension line;

the small end of the lens is sunken inwards to form a sunken space, and a first incident surface for receiving forward light and a second incident surface for receiving lateral light are disposed in the sunken space;

the large end of the lens is provided with a first emergent surface which is sunken inwards and is conical and a second emergent surface which is flat and annular, and light of the light source is emitted out through the first emergent surface and the second emergent surface.

2. The light source switching apparatus for a flashlight as claimed in claim 1, further comprising a gasket, the gasket is disposed between the floodlight source and the spotlight source, then the set distance between the floodlight source and the spotlight source in the axis direction is ensured, and the floodlight source is disposed in the front relative to the spotlight source.

3. The light source switching apparatus for a flashlight as claimed in claim 1, wherein the lens is carried on a lens support, and the lens support is provided with a mounting surface adaptive to the lens in shape.

4. The light source switching apparatus for a flashlight as claimed in claim 2, wherein the switching apparatus further comprises a flashlight head and a lamp holder, and the spotlight source, the floodlight source, the lens and the lens support are coaxially coated and mounted in a space formed after the flashlight head and the lamp holder are mounted.

5. The light source switching apparatus for a flashlight as claimed in claim 4, wherein a mirror is disposed between the flashlight head and the lens.

6. The light source switching apparatus for a flashlight as claimed in claim 5, wherein the back surface, relative to the mounting surface, of the lens support is provided with two positioning columns, the floodlight source is provided with two first positioning holes, the mounting surface of the lamp holder is provided with a set contour concave part matches the spotlight source in shape, the mounting surface of the lamp holder is further provided with two second positioning holes, and the positioning columns, the first positioning holes and the second positioning holes are in one-to-one correspondence;

the positioning columns of the lens support penetrate through the first positioning holes in the floodlight source and are further inserted into the second positioning holes in the lamp holder, so that the floodlight source, the gasket and the spotlight source are fastened on the lamp holder.

7. The light source switching apparatus for a flashlight as claimed in claim 4, wherein the flashlight head and the lamp holder are screwed and installed in a threaded mode.

8. The light source switching apparatus for a flashlight as claimed in claim 1, wherein the light source switching apparatus for a flashlight has two working states: floodlight irradiation state and spotlight irradiation state, wherein in the floodlight irradiation state, both the spotlight source and the floodlight source emit light; and in the spotlight irradiation state, only the spotlight source emits light.

9. The light source switching apparatus for a flashlight as claimed in claim 3, wherein the surface, in contact with the lens, of the lens support is provided with a reflective coating.

* * * * *